United States Patent
Kaplan et al.

(10) Patent No.: US 10,476,298 B1
(45) Date of Patent: Nov. 12, 2019

(54) ELEVATED AUTOMATIC TRANSFER SWITCH CABINET

(71) Applicant: Amazon Technologies, Inc., Seattle, WA (US)

(72) Inventors: Faran Harold Kaplan, Seattle, WA (US); Peter George Ross, Olympia, WA (US)

(73) Assignee: Amazon Technologies, Inc., Seattle, WA (US)

( * ) Notice: Subject to any disclaimer, the term of this patent is extended or adjusted under 35 U.S.C. 154(b) by 552 days.

(21) Appl. No.: 14/843,895

(22) Filed: Sep. 2, 2015

(51) Int. Cl.
*H02J 9/06* (2006.01)

(52) U.S. Cl.
CPC ...................... *H02J 9/06* (2013.01)

(58) Field of Classification Search
CPC .................. G06F 1/28; G06F 1/266
See application file for complete search history.

(56) References Cited

U.S. PATENT DOCUMENTS

| | | | |
|---|---|---|---|
| 4,060,735 A | 11/1977 | Pascucci et al. | |
| 4,361,372 A | 11/1982 | Majkrzak et al. | |
| 5,345,779 A | 9/1994 | Feeney | |
| 5,675,194 A | 10/1997 | Domigan | |
| 6,628,009 B1 | 9/2003 | Chapel | |
| 6,714,977 B1 | 3/2004 | Fowler et al. | |
| 6,782,833 B2 | 8/2004 | Nightall | |
| 6,992,247 B2 | 1/2006 | Rasmussen et al. | |
| 7,031,171 B2 | 4/2006 | Marcotte et al. | |
| 7,252,524 B1 | 8/2007 | Johnson, Jr. et al. | |
| 7,560,831 B2 | 7/2009 | Whitted et al. | |
| 7,830,043 B1 | 11/2010 | Michael et al. | |
| 7,973,253 B2 * | 7/2011 | Gibbs | H02J 9/06 200/50.12 |
| 8,321,163 B2 | 11/2012 | Ewing et al. | |
| 9,041,250 B1 | 5/2015 | Czamara | |
| 9,081,568 B1 * | 7/2015 | Ross | G06F 1/3203 |
| 9,720,476 B1 * | 8/2017 | Nguyen | G06F 1/266 |

(Continued)

OTHER PUBLICATIONS

"Two-Channel Intercom Power Supply PS-232" Clear-Com Intercom Systems 2002, pp. 1-2.

(Continued)

*Primary Examiner* — Daniel Kessie
(74) *Attorney, Agent, or Firm* — Robert C. Kowert; Meyertons, Hood, Kivlin, Kowert & Goetzel, P.C.

(57) ABSTRACT

An elevated automatic transfer switch (ATS) cabinet provides power support redundancy to a set of electrical loads in one or more rack computer systems. The cabinet includes multiple-phase power feed input receptacles which each receive a multiple-phase power feed and distribute the separate phases of the power feed to separate ATS modules installed in the cabinet. Outputs from separate ATS modules can be distributed, via separate cabinet output receptacles, to electrical loads in one or more rack computer systems. Backup ATS modules can be installed in parallel with ATS modules, so that ATS modules can be replaced while maintaining power support. Particular bypass circuits in the cabinet can be selectively closed to bypass selected ATS modules with selected power feeds, based on manual interaction with one or more elements of the bypass circuit, including manual insertion of a conductive element into a slot element of the bypass circuit.

20 Claims, 6 Drawing Sheets

(56) References Cited

U.S. PATENT DOCUMENTS

| | | |
|---|---|---|
| 9,891,682 B1 | 2/2018 | Czamara et al. |
| 2005/0068716 A1 | 3/2005 | Pereira |
| 2007/0046103 A1 | 3/2007 | Belady et al. |
| 2007/0217125 A1 | 9/2007 | Johnson |
| 2007/0217128 A1 | 9/2007 | Johnson, Jr. |
| 2007/0217178 A1 | 9/2007 | Johnson, Jr. et al. |
| 2008/0093927 A1 | 4/2008 | Ewing et al. |
| 2009/0109622 A1 | 4/2009 | Parish et al. |
| 2009/0168345 A1 | 7/2009 | Martini |
| 2009/0195977 A1 | 8/2009 | Fink et al. |
| 2009/0216386 A1* | 8/2009 | Wedel ............... H02J 3/14 700/295 |
| 2009/0234512 A1 | 9/2009 | Ewing et al. |
| 2009/0296352 A1 | 12/2009 | Lima |
| 2009/0314541 A1 | 12/2009 | Jones et al. |
| 2010/0027216 A1 | 2/2010 | Matsushima et al. |
| 2010/0043858 A1 | 2/2010 | Matsui et al. |
| 2010/0141038 A1 | 6/2010 | Chapel et al. |
| 2010/0235671 A9 | 9/2010 | Jain |
| 2011/0187197 A1 | 8/2011 | Moth |
| 2011/0242755 A1 | 10/2011 | Zeighami et al. |
| 2011/0317357 A1 | 12/2011 | Sato et al. |
| 2011/0317367 A1 | 12/2011 | Campbell et al. |
| 2012/0014060 A1 | 1/2012 | Slessman |
| 2012/0033377 A1 | 2/2012 | Salpeter |
| 2012/0075806 A1 | 3/2012 | Wormsbecher et al. |
| 2012/0127653 A1 | 5/2012 | Keisling et al. |
| 2012/0147560 A1 | 6/2012 | Zeng et al. |
| 2012/0181869 A1* | 7/2012 | Chapel ............... H02J 9/06 307/64 |
| 2012/0201003 A1 | 8/2012 | Shimasaki et al. |
| 2012/0300391 A1 | 11/2012 | Keisling et al. |
| 2013/0003299 A1 | 1/2013 | Wissner et al. |
| 2013/0017955 A1 | 1/2013 | Hennessy et al. |
| 2013/0063897 A1 | 3/2013 | Howes et al. |
| 2013/0107448 A1 | 5/2013 | Hamburgen et al. |
| 2013/0128455 A1 | 5/2013 | Koblenz et al. |
| 2013/0135819 A1 | 5/2013 | Wang |
| 2013/0176678 A1 | 7/2013 | Campbell |
| 2013/0235524 A1 | 9/2013 | Baba et al. |
| 2013/0258582 A1 | 10/2013 | Shelnutt et al. |
| 2013/0286587 A1 | 10/2013 | Martini |
| 2013/0301219 A1 | 11/2013 | Knudsen et al. |
| 2014/0183956 A1 | 7/2014 | Wang et al. |
| 2015/0115719 A1* | 4/2015 | Siciliano ............... H02J 3/00 307/64 |
| 2015/0234440 A1* | 8/2015 | Gardner ............... G06F 1/30 713/300 |
| 2015/0357798 A1 | 12/2015 | Loeffler et al. |

OTHER PUBLICATIONS

Keith Brandt "When Bad Harmonics Happen to Good People" Downloaded May 13, 2011 from news.ospmag.com OSP Magazine published Nov. 2007 pp. 1-3.

U.S. Appl. No. 13/173,102, filed Jun. 30 2011, Osvaldo P Morales et al.

U.S. Appl. No. 13/071,488, filed Mar. 24, 2011, Michael P. Czamara et al.

U.S. Appl. No. 13/076,198, filed Jun. 30 2011, Osvaldo P Morales et al.

Emerson Network Power "Asco 7000 Series Power Transfer Switches" Jul. 2014, 28 Pages.

GE Energy "ZBTE Low-Voltage Bypass/Isolation Open Transition Automatic and Manual Transfer Switches" 2011 General Electric Company, 2 Pages.

Volume 2—Commercial Distribution "Trasnfer Switches" Apr. 2014, 118 pages.

U.S. Appl. No. 15/628,010, filed Jun. 20, 2017, Mike MacGregor.

U.S. Appl. No. 15/608,728, filed May 30, 2017, Wildstone, et al.

Liteon, "Datasheet," Lite-On Power System Solutions, Dec. 2016, pp. 1-10.

Liteon; Power System Solutions, "Are you buying technology that you already own?," downloaded on Mar. 15, 2017, pp. 1-8.

U.S. Appl. No. 15/715,760, filed Sep. 26, 2017, Michael Jon Moen, et al.

U.S. Appl. No. 15/862,013, filed Sep. 22, 2015, Patel.

U.S. Appl. No. 14/656,356, filed Mar. 12, 2015, Ross, et al.

U.S. Appl. No. 15/070,969, filed Mar. 15, 2016, Morales, et al.

U.S. Appl. No. 13/420,743, filed Mar. 15, 2012, Michael P. Czamara.

\* cited by examiner

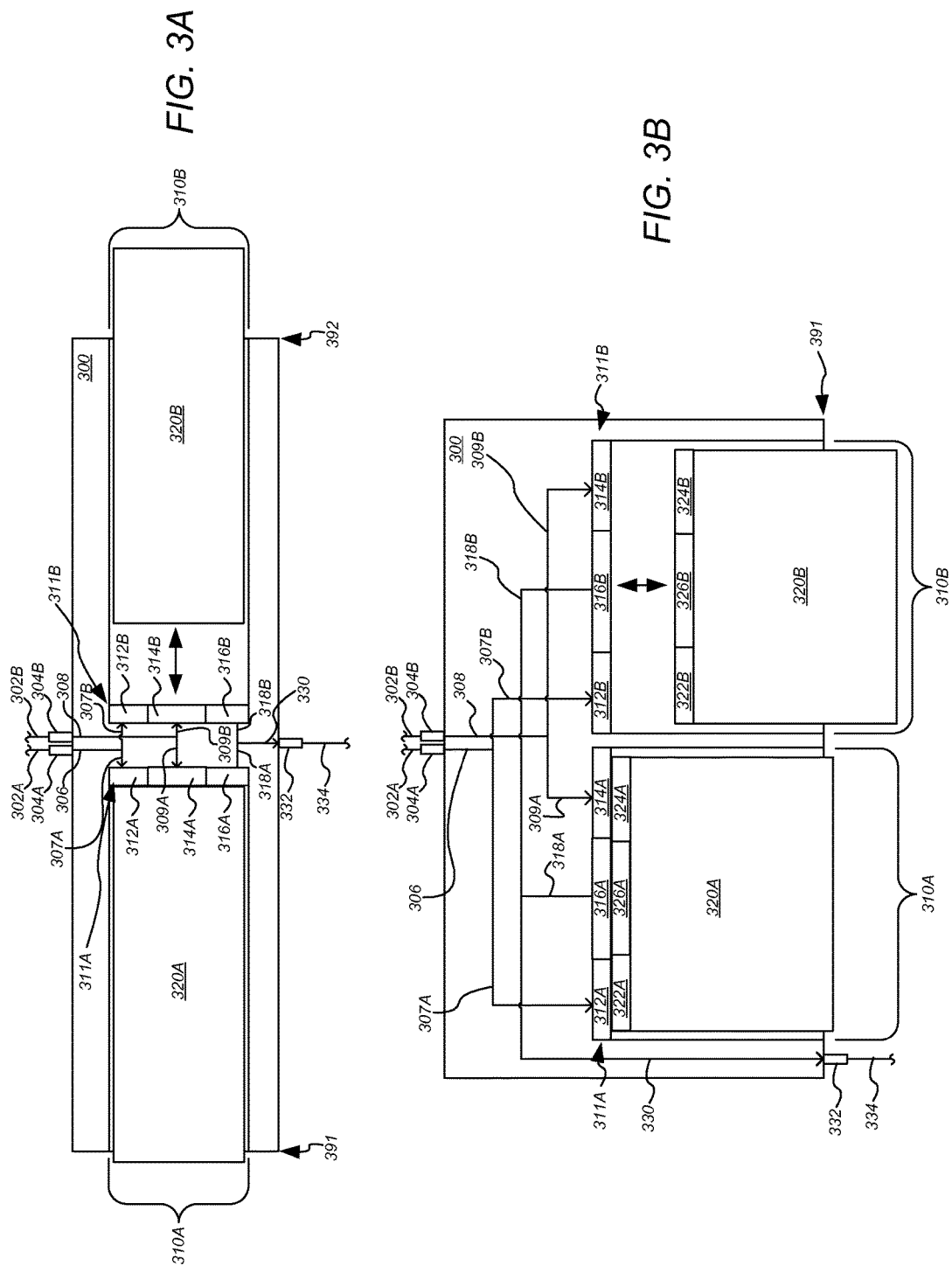

ELEVATED AUTOMATIC TRANSFER SWITCH CABINET

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 208V). A network of cabling, bus bars, power connectors, and power distribution units, is used to deliver the power at the lower voltage to numerous specific components in the facility.

Some data centers have no redundancy at the PDU level. Such data centers may have a large affected zone when a UPS or PDU failure in the power system occurs. In addition, some data centers have "single threaded" distribution via the electrical supply to the floor, and in which maintenance can only be performed when the components are shut-off. The down-time associated with maintenance and reconfiguration of primary power systems in a data center may result in a significant loss in computing resources. In some critical systems such as hospital equipment and security systems, down-time may result in significant disruption and, in some cases, adversely affect health and safety.

Some systems include dual power systems that provide redundant power support for computing equipment. In some systems, an automatic transfer switch ("ATS") provides switching from a primary power system to a secondary (e.g., back-up) power system. In a typical system, the automatic transfer switch automatically switches a server rack to the secondary system upon detecting a fault in the primary power. To maintain the computing equipment in continuous operation, the automatic transfer switch may need to make the transfer to secondary power system rapidly (for example, within about 16 milliseconds).

Some data centers include back-up components and systems to provide back-up power to servers in the event of a failure of components or systems in a primary power system. In some data centers, a primary power system may have its own back-up system that is fully redundant at all levels of the power system. Such a level of redundancy for the systems and components supported by the primary and fully-redundant back-up system may be referred to as "2N" redundancy. For example, in a data center having multiple server rooms, one or more server racks may receive power support from a primary power system and fully-redundant back-up power system. The back-up system for each server room may have a switchboard, uninterruptible power supply (UPS), and floor power distribution unit (PDU) that mirrors a corresponding switchboard, uninterruptible power supply, and floor power distribution unit in the primary power system for that server room. Providing full redundancy of the primary power systems may, however, be very costly both in terms of capital costs (in that in may require a large number of expensive switchboard, UPSs, and PDUs, for example) and in terms of costs of operation and maintenance. In addition, with respect to the primary computer systems, special procedures may be required to switch components from the primary system to a back-up system to ensure uninterrupted power supply for the servers, further increasing maintenance costs. As a result, some data centers may include a back-up system that is less than fully redundant for a primary power system. Such a level of redundancy for the systems and components supported by the primary and fully-redundant back-up system may be referred to as "N+1" redundancy. While N+1 redundancy may not provide fully-redundant reserve power support for computing equipment, such redundancy may involve lower capital and operating costs.

In some data centers, some sets of computing equipment may be configured for power support of various types of redundancy. For example, some server racks having servers configured for critical tasks may receive 2N reserve power support, some server racks may receive N+1 reserve power support, and some server racks may receive a concurrent supply of power from one or more separate power feeds independently of an upstream transfer switch. Configuring each rack for a particular type of power redundancy with support from particular power systems may be costly and time-consuming, as each configuration may require specific configurations of specific upstream systems and components to establish a given power support redundancy for a given server rack.

As a result, providing various redundancies, from various power sources, to various sets of computing equipment in a data center may require excessive expenditures of time, resources, and data center floor space, wall space, etc. to provide specific systems and components for each particular power support redundancy type from each particular power system used to provide such redundancies. In addition, due to the specific systems and components, and configurations thereof, required to implement a given redundancy, changing a power support redundancy for a particular set of computing equipment may be time consuming and expensive, as such changes may require re-arrangement, addition, removal, etc. of various systems and component configurations specific to enabling such redundancies. Such changes may further require extended computing unit downtime to implement changes in specific systems and components, as such reconfigurations of various systems and components in a data center may require temporarily taking otherwise unrelated systems and components offline, thereby exacerbating costs.

The amount of computing capacity needed for any given data center may change rapidly as business needs dictate. Most often, there is a need for increased computing capacity at a location. Initially providing computing capacity in a data center, or expanding the existing capacity of a data center (in the form of additional servers, for example), is resource-intensive and may take many months to implement. Substantial time and resources are typically required to design and build a data center (or expansion thereof), lay cables, install racks, enclosures, and cooling systems to implement waste heat removal therefrom. Additional time and resources are typically needed to conduct inspections and obtain certifications and approvals, such as for electrical and HVAC systems.

BRIEF DESCRIPTION OF THE DRAWINGS

FIG. 3A-B are schematic diagrams illustrating orthogonal views of elevated ATS cabinets which include ATS module slots which are electrically coupled in parallel with corresponding backup ATS module slots, according to some embodiments.

Figure 1:
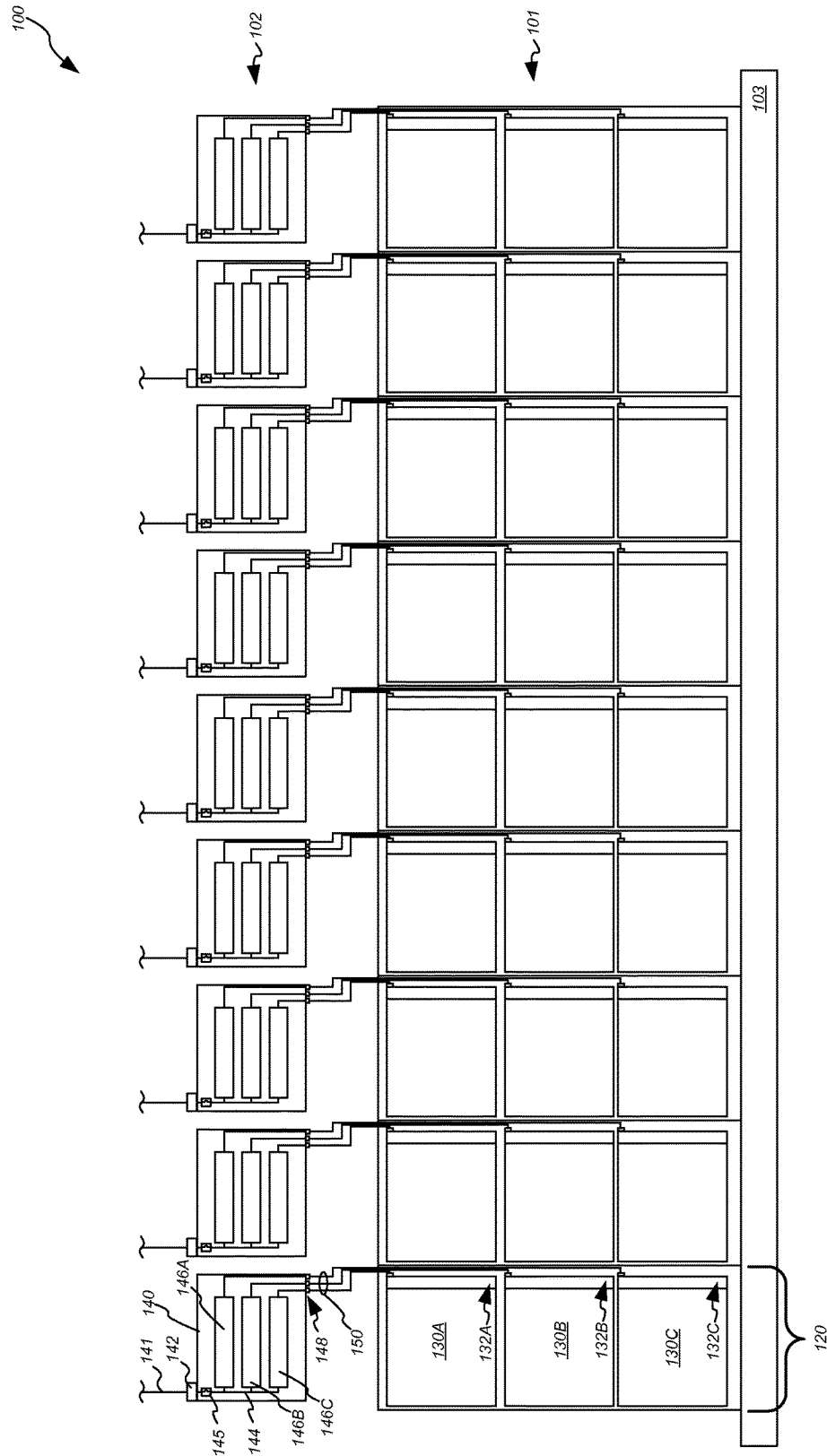
FIG. 1 is a schematic illustrating an orthogonal view of an electrical load space which includes a row of rack computer systems and separate elevated ATS cabinets which are supported over separate rack computer systems and each provide power redundancy support, based on multi-phase power feeds, to separate sets of electrical loads in a separate corresponding one of the rack computer systems, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of elevated automatic transfer switch (ATS) cabinets are disclosed.

According to one embodiment, a data center includes at least two power distribution systems configured to supply separate multiple-phase power feeds and a computer space configured to support computing operations. The computer space includes at least one set of rack computer systems, wherein each rack computer system comprises a set of computer systems and a corresponding set of power distribution units which are each configured to distribute received power to a separate computer system of the corresponding set of computer systems. The computer space further includes at least one set of elevated automatic transfer switch (ATS) cabinets which are each mounted in elevated positions above a separate rack computer system of the set of rack computer systems and are each configured to selectively supply power, to electrical loads included in at least one rack computer system of the set of rack computer systems, from a selected multiple-phase power feed of the separate multiple-phase power feeds. Each elevated ATS cabinet includes a set of multiple-phase cabinet input receptacles, which are each configured to couple to a separate multiple-phase power feed and to distribute separate phases of the coupled multiple phase power feed to separate internal power feeds, and a set of ATS modules installed in separate ATS module slots of a set of ATS module slots. Each ATS module slot included in the set of ATS module slots is configured to electrically couple a separate ATS module installed in the respective ATS module slot with a separate internal feed carrying a separate phase of the individual multiple phase power feed based on blind-mate connections between the set of blind-mate slot power feed connectors and blind-mate ATS inlet connectors of the separate ATS module.

According to one embodiment, an apparatus includes an elevated automatic transfer switch (ATS) cabinet configured to provide power support to a set of electrical loads via a set of ATS modules which are each configured to selectively distribute power to separate electrical loads from a selected power feed. The elevated ATS cabinet includes a multiple-phase cabinet input receptacle configured to couple to a multiple-phase power transmission line carrying an individual multiple phase power feed, the multiple-phase cabinet input receptacle further configured to distribute the separate phases of the individual multiple phase power feed as separate internal feeds. The elevated ATS cabinet further includes a set of ATS module slots, each comprising a set of blind-mate slot power feed connectors which are electrically coupled to separate internal power feeds supplied by the multiple-phase cabinet input receptacle, wherein each ATS module slot included in the set of ATS module slots is configured to electrically couple a separate ATS module installed in the respective ATS module slot with a separate internal feed carrying a separate phase of the individual multiple phase power feed based on blind-mate connections between the set of blind-mate slot power feed connectors and blind-mate ATS inlet connectors of the separate ATS module.

According to one embodiment, a method includes configuring an elevated automatic transfer switch (ATS) cabinet to provide power support to a set of electrical loads via a set of ATS modules which are each configured to selectively distribute power to separate electrical loads from a selected power feed. The configuring includes coupling a multiple-phase cabinet input receptacle to a multiple-phase power transmission line carrying an individual multiple phase power feed, wherein the multiple-phase cabinet input receptacle is configured to distribute the separate phases of the individual multiple phase power feed as separate internal feeds. The configuring further includes installing a set of ATS modules in a set of ATS module slots of the elevated ATS cabinet, wherein each ATS module slot comprises a separate set of blind-mate slot power feed connectors is electrically coupled to a separate internal power feed supplied by the multiple-phase cabinet input receptacle, such that installing a given ATS module in a given ATS module slot comprises establishing blind-mate connections, between the set of blind-mate slot connectors in the given ATS module slot and blind-mate ATS inlet connectors of the given ATS module, which electrically couples the given ATS module with a separate internal power feed carrying a separate phase of the individual multiple phase power feed.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "operating power" means power that can be used by one or more computer system components. Operating power may be stepped down in a power distribution unit or in elements downstream from the power distribution units. For example, a server power supply may step down operating power voltages (and rectify alternating current to direct current).

As used herein, providing power "support" refers to providing one or more power feeds to be available to one or more downstream systems and components, including one or more electrical loads. Such provided power feeds may be precluded from being received by the systems and components but may be made available for receipt based at least in part upon a positioning of one or more components upstream of the systems and components. For example, a reserve power system may provide reserve power support to an electrical load by providing a reserve power feed that can be selectively routed to the load by a transfer switch that is downstream of the reserve power system and upstream of the load, where the transfer switch may selectively route the reserve power feed or a primary power feed to the load based at least in part upon one or more conditions associated with the primary power feed.

As used herein, "power distribution unit", also referred to herein as a "PDU", means any device, module, component, or combination thereof, which can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.).

As used herein, "primary power" means any power that can be supplied to an electrical load, for example, during normal operating conditions.

As used herein, "floor power distribution unit" refers to a power distribution unit that can distribute electrical power to various components in a computer room. In certain embodiments, a power distribution unit includes a k-rated transformer. A power distribution unit may be housed in an enclosure, such as a cabinet.

As used herein, "rack power distribution unit" refers to a power distribution unit that can be used to distribute electrical power to various components in a rack. A rack power distribution may include various components and elements, including wiring, bus bars, connectors, and circuit breakers.

As used herein, "reserve power" means power that can be supplied to an electrical load upon the failure of, or as a substitute for, primary power to the load.

As used herein, "physically coupled" refers to a connection that physically connects two or more components and is configured to electrically couple and electrically isolate the two or more components. For example, two wires are physically coupled via a switch. And, the switch is configured to electrically couple and electrically isolate the two wires by closing and opening the switch.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

FIG. 1 is a schematic illustrating an orthogonal view of an electrical load space which includes a row of rack computer systems and separate elevated ATS cabinets which are supported over separate rack computer systems and each provide power redundancy support, based on multi-phase power feeds, to separate sets of electrical loads in a separate corresponding one of the rack computer systems, according to some embodiments.

As shown, in FIG. 1, an electrical load space 100 can include a computer space, where the space 100 includes a set 101 of rack computer systems 120 which are mounted on a floor element 103 and a corresponding set 102 of elevated ATS cabinets 140 which are suspended in elevated positions over corresponding rack computer systems 120.

As shown, each rack computer system 120 includes a set of computer systems 130A-C, where each separate computer system 130 is coupled to a corresponding rack power distribution unit (PDU) 132 included in a corresponding set of rack PDUs 132A-C. Each rack PDU 132 can be coupled to a separate power transmission line 150, which can include an instance of power cabling, such that each separate set of computer systems 130A-C included in a given rack computer system 120 receives power support via a separate power transmission line 150.

In some embodiments, an elevated ATS cabinet is configured to receive one or more power feeds which are multiple-phase power feeds, where the elevated ATS cabinet distributes the separate phases of the multiple-phase power feed to multiple separate ATS modules installed in the cabinet, so that a single multiple-phase power feed input receptacle in the cabinet supplies the multiple separate phases of power to the multiple separate ATS modules included in the cabinet.

As shown in FIG. 1, for example, each elevated ATS cabinet 140 in the set 102 includes at least one multiple-phase cabinet input receptacle 142 which is configured to couple with a power transmission line 141 which carries an individual multiple-phase power feed. The receptacle 142 is coupled to a set of internal power feeds 144 included in the cabinet 140, where the various internal power feeds 144 included in a cabinet couple the receptacle 142 with separate ATS modules 146A-C included in the cabinet 140. Each separate instance of internal power feeds is configured to supply a separate phase of power, of the multiple-phase power feed received at receptacle 142 from line 141, from the receptacle 142 to a separate ATS module 146A-C.

As shown, each elevated ATS cabinet 140 includes a set of ATS modules 146A-C which each include a separate ATS device which is configured to selectively supply power received from one of two or more power feeds. In the illustrated embodiment shown in FIG. 1, each separate ATS module 146 receives, via the internal power feeds 144, a separate single-phase power feed, of the multiple phase power feed received at receptacle 142 from line 141. It will be understood that each ATS module 146 can be coupled to at least one additional single-phase power feed from at least one additional multiple phase power feed via a separate receptacle 142 and internal power feed 144, which is not shown in FIG. 1. In some embodiments, each ATS module 146 is configured to selectively supply a common phase of power received from one of two or more separate multiple-phase power feeds.

As shown, each separate ATS module supplies a separate power output feed which is supplied to a separate corresponding cabinet outlet receptacle 148. Because each separate ATS module 146A-C can selectively supply a separate phase of power, each receptacle 148 can supply a separate phase of power.

As shown, each elevated ATS cabinet 140 includes at least one circuit breaker device 145 which is configured to isolate the receptacles 148 of the cabinet 140 from the input receptacle 142. The circuit breaker devices 145, in some embodiments, can be located downstream of one or more ATS modules 146, upstream of the one or more ATS modules, etc. The cabinet 140 can include one or more circuit breaker devices 145 included in each of one or more internal power feeds 144 included in a cabinet. A circuit breaker device 145 can trip and cause downstream components to be electrically isolated from an upstream power feed based on the current received at the circuit breaker device 145 exceeding one or more threshold values.

In some embodiments, multiple PDUs 132 in a rack computer system are coupled to power transmission lines 150 which carry power from a common power source, ATS cabinet 140, etc. As a result, the various sets of computer systems 130A-C in a rack computer system 140, which are each supported by a separate PDU 132 in the rack 120, can be supported via a separate phase of power supplied by a separate ATS module included in an individual ATS cabinet, which can include an elevated ATS cabinet mounted in an elevated position above the rack 120.

As shown in FIG. 1, for example, each rack 120 is associated with a separate ATS cabinet 140 which is mounted in an elevated position above the respective rack 120. Each ATS cabinet 140 receives at least one multiple-phase power feed via a multiple-phase line 141, supplies the separate phases of the at least one multiple-phase power feed to separate ATS modules 146 in the cabinet 140, and the separate ATS modules 146A-C supply separate phases of power to separate cabinet outlet receptacles 148 of the cabinet 140. The separate receptacles 148 are each coupled, via separate instances of power transmission lines 150, to separate PDUs 132A-C in the rack 120 beneath the cabinet 140, so that each separate ATS module 146 in the given cabinet 140 supports a separate set of computer systems 130 in the given rack 120 under the cabinet 140.

In some embodiments, where ATS cabinets are configured to supply separate single-phase feeds of power to separate rack PDUs in an individual rack computer system, elevated ATS cabinets can be installed incrementally based on installation of a corresponding individual rack computer system to which the ATS cabinet is to provide power support. For example, in the illustrated embodiment, ATS cabinets 140 in set 102 can be installed incrementally based on incremental installation of corresponding rack computer system 120 in set 101. As a result, capital expenditures associated with ATS installation can be at least partially deferred until power support provided by a given ATS cabinet is required to support an installed rack computer system.

Figure 2:
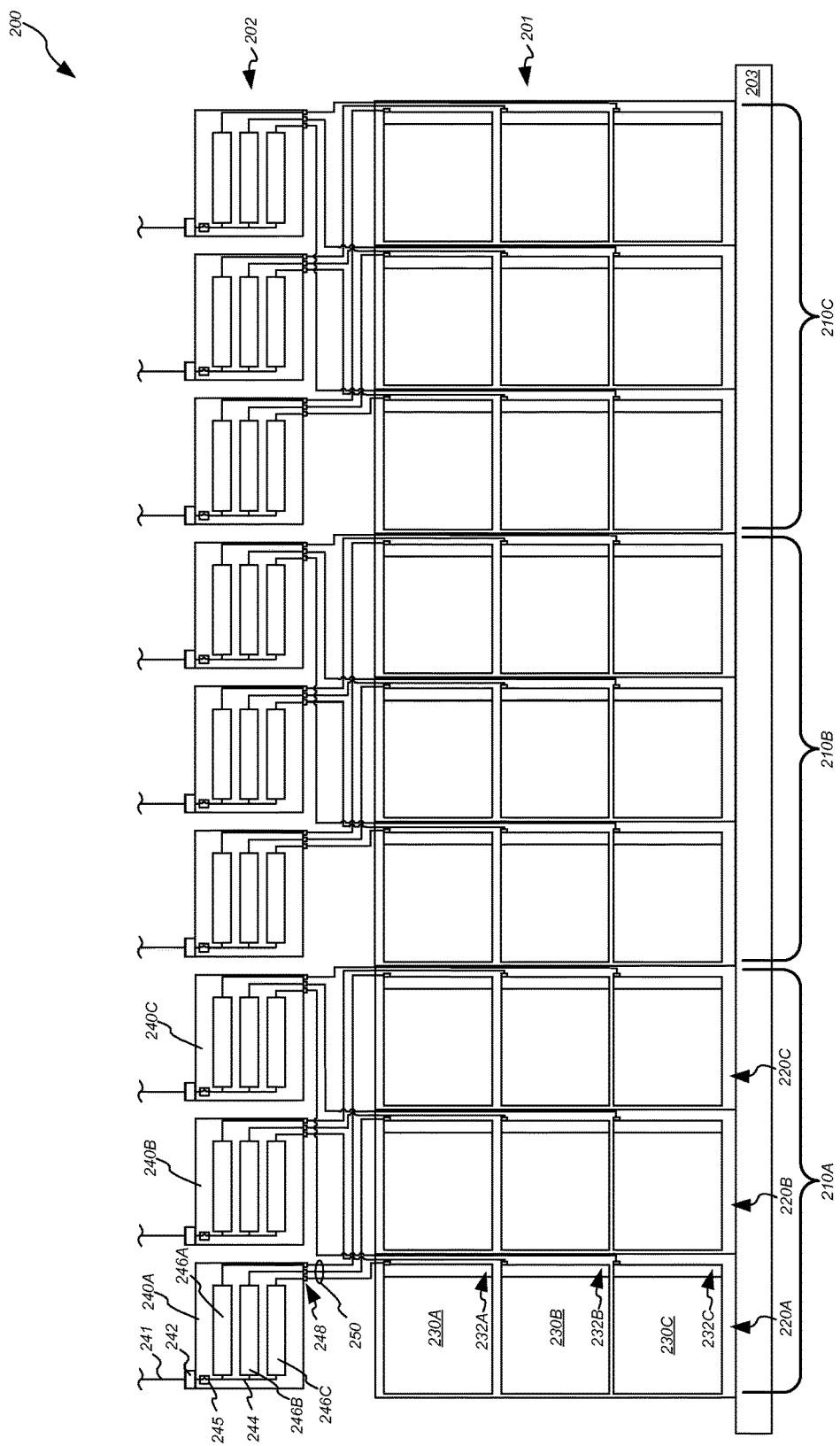
FIG. 2 is a schematic illustrating an orthogonal view of an electrical load space which includes a row of multiple sets of rack computer systems and elevated ATS cabinets, where each ATS cabinet provides power redundancy support, based on multi-phase power feeds, to separate sets of electrical loads in separate rack computer systems of a given set of rack computer systems, according to some embodiments.

FIG. 2 is a schematic illustrating an orthogonal view of an electrical load space which includes a row of multiple sets of rack computer systems and elevated ATS cabinets, where each ATS cabinet provides power redundancy support, based on multi-phase power feeds, to separate sets of electrical loads in separate rack computer systems of a given set of rack computer systems, according to some embodiments.

As shown, in FIG. 2, an electrical load space 200 can include a computer space, where the space 200 includes a set 201 of rack computer systems 220 which are mounted on a floor element 203 and a corresponding set 202 of elevated ATS cabinets 240 which are suspended in elevated positions over corresponding rack computer systems 220.

As shown, each rack computer systems 220 includes a set of computer systems 230A-C, where each separate computer system 230 is coupled to a corresponding rack power distribution unit (PDU) 232 included in a corresponding set of rack PDUs 232A-C. Each rack PDU 232 can be coupled to a separate power transmission line 250, which can include an instance of power cabling, such that each separate set of computer systems 230A-C included in a given rack computer system 220 receives power support via a separate power transmission line 250.

In some embodiments, an elevated ATS cabinet is configured to receive one or more power feeds which are multiple-phase power feeds, where the elevated ATS cabinet distributes the separate phases of the multiple-phase power feed to multiple separate ATS modules installed in the cabinet, so that a single multiple-phase power feed input receptacle in the cabinet supplies the multiple separate phases of power to the multiple separate ATS modules included in the cabinet.

As shown in FIG. 2, for example, each elevated ATS cabinet 240 in the row 202 includes at least one multiple-phase cabinet input receptacle 242 which is configured to couple with a power transmission line 241 which carries an individual multiple-phase power feed. The receptacle 242 is coupled to a set of internal power feeds 244 included in the cabinet 240, where the various internal power feeds 244 included in a cabinet couple the receptacle 242 with separate ATS modules 246A-C included in the cabinet 240. Each separate instance of internal power feeds is configured to supply a separate phase of power, of the multiple-phase power feed received at receptacle 242 from line 241, from the receptacle 242 to a separate ATS module 246A-C.

As shown, each elevated ATS cabinet 240 includes a set of ATS modules 246A-C which each include a separate ATS device which is configured to selectively supply power received from one of two or more power sources. In the illustrated embodiment shown in FIG. 2, each separate ATS module 246 receives, via the internal power feeds 244, a separate single-phase power feed, of the multiple phase power feed received at receptacle 242 from line 241. It will be understood that each ATS module 246 can be coupled to at least one additional single-phase power feed from at least one additional multiple phase power feed via a separate receptacle 242 and internal power feed 244, which is not shown in FIG. 2. In some embodiments, each ATS module 246 is configured to selectively supply a common phase of power received from one of two or more separate multiple-phase power feeds.

As shown, each separate ATS module supplies a separate power output feed which is supplied to a separate corresponding cabinet outlet receptacle 248. Because each separate ATS module 246A-C can selectively supply a separate phase of power, each receptacle 248 can supply a separate phase of power.

As shown, each elevated ATS cabinet 240 includes at least one circuit breaker device 245 which is configured to isolate the receptacles 248 of the cabinet 240 from the input receptacle 242. The circuit breaker devices 245, in some embodiments, can be located downstream of one or more ATS modules 246, upstream of the one or more ATS modules, etc. The cabinet 240 can include one or more circuit breaker devices 245 included in each of one or more internal power feeds 244 included in a cabinet. A circuit breaker device 245 can trip and cause downstream components to be electrically isolated from an upstream power feed based on the current received at the circuit breaker device 245 exceeding one or more threshold values.

In some embodiments, separate cabinet outlet receptacles in a given ATS cabinet are coupled to separate rack PDUs which are included in separate rack computer systems. As a result, a given elevated ATS cabinet provides power support, power redundancy support, etc. to one or more computer systems included in multiple rack computer systems, and each rack computer system includes multiple sets of computer systems which each receive power support, power redundancy support, etc. from ATS modules included in separate elevated ATS modules. Furthermore, rack PDUs in a rack computer system can be configured to receive a common phase of power from multiple separate ATS cabinets.

In the illustrated embodiment, the ATS cabinets 240 and rack computer systems 220 are grouped into separate "sets" 210A-C. Each set 210 includes a set of rack computer systems 220A-C and a corresponding set of elevated ATS cabinets 240A-C which provide power support to the rack computer systems 220A-C. Furthermore, the cabinet outlet receptacles 248 of each elevated ATS cabinet 240 are coupled to rack PDUs 232 in different rack computer systems 220A-C of the set 210.

For example, cabinet 240A includes receptacles 248 which are each coupled to a separate one of the rack PDUs 232A included in each separate rack computer system 220 in set 210A. Similarly, cabinet 240B includes receptacles 248 which are each coupled to a separate one of the rack PDUs 232B included in each separate rack computer system 220 in set 210A, and cabinet 240C includes receptacles 248 which are each coupled to a separate one of the rack PDUs 232C included in each separate rack computer system 220 in set 210A. As a result, a fault in cabinet 240A is restricted to affecting the set of computer systems 230A in the racks 220A-C, while the sets of computer systems 230B-C in the racks 220A-C are isolated from the effects of a fault in ATS cabinet 240A.

In some embodiments, the cabinets 240A-C in a given set 210 are configured to supply power to separate rack PDUs 232 in separate racks 220 in the set 210, so that each separate rack 220 receives a common phase of power, at separate PDUs 232 in the rack 220, from separate ATS cabinets 240.

FIG. 3A-B are schematic diagrams illustrating orthogonal views of elevated ATS cabinets which include ATS module slots which are electrically coupled in parallel with corresponding backup ATS module slots, according to some embodiments. The ATS cabinets 300 included in FIG. 3A-B can be included in any of the embodiments of ATS cabinets included herein.

In some embodiments, an elevated ATS cabinet includes one or more ATS module slots which are configured to receive a separate ATS module. An ATS module slot can include a set of slot blind-mate connectors which are configured to couple with corresponding blind mate connectors of an ATS module so that an ATS module mounted in a given ATS module slot is coupled to a set of power feeds via blind mate connections and a particular cabinet outlet receptacle via a blind mate connection.

For example, as shown in FIG. 3A-B, an elevated ATS cabinet can include an ATS module slot 310A which includes a set 311A of slot blind-mate connectors, including power feed blind mate connectors 312A, 314A and a power outlet blind mate connector 316A.

As further shown, an ATS cabinet 300 can include at least two cabinet input receptacles 304A-B which are each configured to couple with a separate power transmission line 302A-B which carries a separate multiple-phase power feed. Each interface 304A-B can distribute separate single-phase power feeds, each including a separate phase of the received multiple-phase power feed, to separate ATS module slots. The illustrated interfaces 304A-B are shown to distribute a single feed 306, 308. It will be understood that each interface 304A-B can distribute additional internal power feeds 306, 308 to separate slots 310, where the additional internal power feeds carry separate phases of power from the power carried on the illustrated feeds 306, 308.

Each separate multiple-phase power feed received at the separate interfaces 304A-B can be received from a separate power source. As shown, a single-phase power feed from each of the received multiple-phase power feeds can be distributed to a separate power feed blind-mate connector 312A, 314A of the slot 310A via internal power feeds 306 and 307A, 308 and 309A. The slot power feed blind mate connectors 312A, 314A are configured to couple with corresponding ATS module inlet blind mate connectors 322A, 324A of an ATS module 320A mounted in the slot 310A.

In addition, the ATS module slot 310A includes a slot outlet feed blind mate connector 316A which is coupled to one or more outlet feeds 318A, 330 which couple the connector 316A to a cabinet outlet receptacle 332 of the cabinet 300. The receptacle 332 can be coupled to a power transmission line 334 which is coupled to a rack PDU, so that power carried by at least the outlet feed 330 can be supplied to a rack PDU which is coupled to receptacle 332. The connector 316A can be coupled to an ATS outlet blind mate connector 326A included in ATS module 320A. As a result, power selectively distributed by an ATS included in the module 320A, which includes one of the power feeds supplied to the ATS via connectors 312A, 314A, 322A, and 324A is supplied to power line 334 via receptacle 332.

In some embodiments, an ATS cabinet includes at least one backup ATS module slot which is coupled in parallel with a corresponding ATS module slot, so that slot blind mate connectors included in the backup ATS module slot are coupled in parallel with the internal power feeds and outlet feeds to which the corresponding ATS module slot is coupled. As a result, a backup ATS module installed in a backup ATS module slot can be electrically coupled, in parallel, with the internal power feeds to which an ATS module installed in the corresponding ATS module slot is coupled.

Such a parallel configuration of a backup ATS module slot enables a backup ATS module to provide redundant power support for an ATS module installed in a corresponding ATS module slot. The backup ATS module slot can initially be empty, while an ATS module installed in a corresponding ATS module slot provides power support to an electrical load coupled to a particular cabinet outlet receptacle. In response to a determination of a fault associated with the ATS module, including the ATS included in the ATS module being stuck in a particular switch position, a backup ATS module can be installed in the corresponding backup ATS module slot, so that the backup ATS module receives power from the same power feeds as the faulty ATS module and supplies power to the same cabinet outlet receptacle. Because the backup ATS module is coupled in parallel with the faulty ATS module, the faulty ATS module can be swapped from the corresponding ATS module slot without compromising power support provided to electrical loads coupled to the particular cabinet outlet receptacle. Upon installation of a replacement ATS module in the ATS module slot, the backup ATS module can be removed from the backup ATS module slot.

As shown in FIG. 3A-B, the elevated ATS cabinet 300 can include, for at least one ATS module slot 310A, a corresponding backup ATS module slot 310B which includes a set 311B of blind mate connectors 312B, 314B, 316B configured to couple a backup ATS module 320B mounted in the slot 310B in parallel with a corresponding ATS module 320A installed in the corresponding slot 310A. As shown, a backup ATS module 320B installed in the backup slot 310B is coupled in parallel with the same internal power feeds 306, 308 to which ATS module 320A is coupled, via feeds 307B and 309B. In addition, the backup ATS module 320 is coupled in parallel with the same outlet feed 330 as the ATS module 320A, via outlet feed 318B. As a result, the backup ATS module 320B can provide power support in parallel with module 320A and can provide power support in place of module 320A while module 320A is being replaced.

In some embodiments, an ATS cabinet includes multiple separate faces and can be configured to include backup ATS module slots which open to separate faces of the cabinet relative to the faces to which corresponding ATS module slots open. As a result, a backup ATS module for a given installed ATS module can be installed into a backup slot which opens to a separate face of the ATS cabinet from the face into which the installed ATS module is installed. For example, as shown in FIG. 3A, the elevated ATS cabinet 300 includes ATS module slot 310A which opens to face 391 of the cabinet 300, and a corresponding backup ATS module slot 310B which opens to an opposite face 392 of the cabinet 300.

In some embodiments, backup ATS module slots open to a common face with the corresponding ATS module slots. For example, as shown in FIG. 3B, the elevated ATS cabinet 300 includes ATS module slot 310A and the corresponding backup ATS module slot 310B which both open to a common face 391 of the cabinet 300.

Figure 4B:
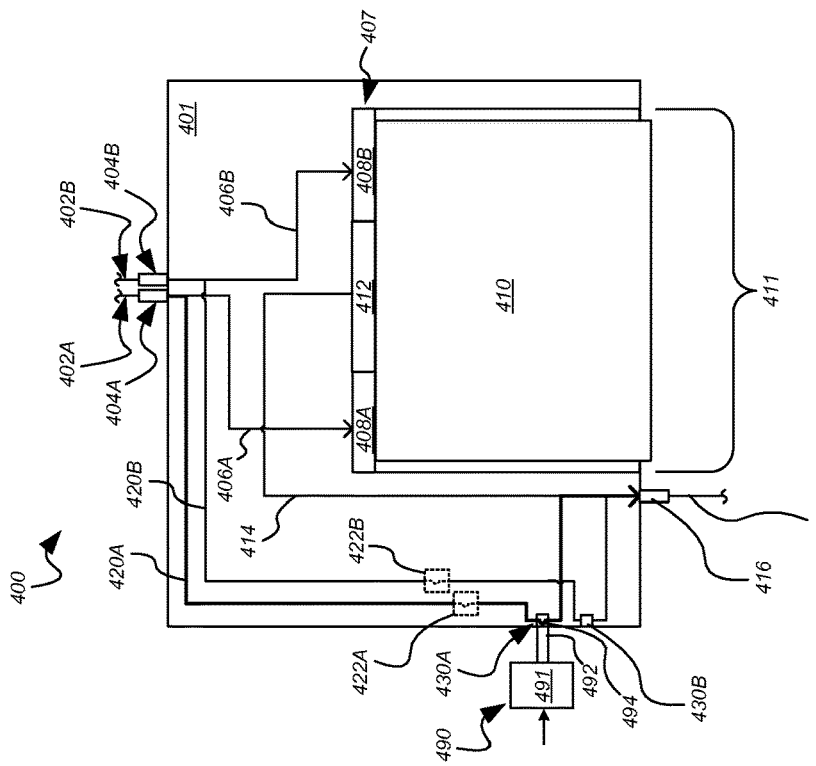
FIG. 4A-B are schematic diagrams illustrating orthogonal views of an elevated ATS cabinet which includes bypass circuits which can be selectively closed to selectively route a selected power feed to a cabinet outlet receptacle in a bypass of a corresponding ATS module slot, according to some embodiments.
Figure 4A:
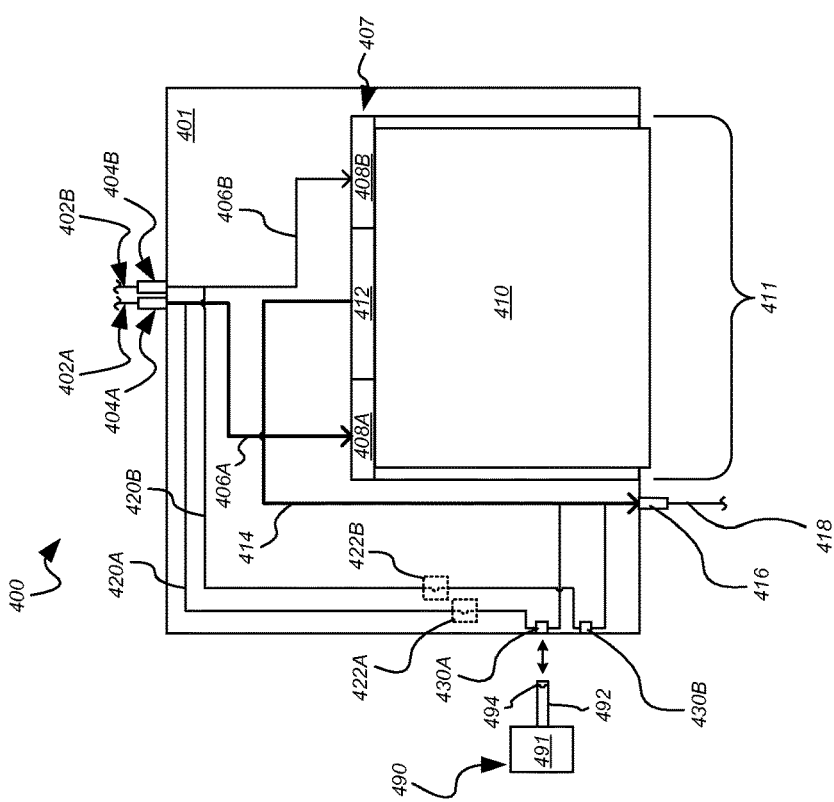

FIG. 4A-B are schematic diagrams illustrating orthogonal views of an elevated ATS cabinet which includes bypass circuits which can be selectively closed to selectively route a selected power feed to a cabinet outlet receptacle in a bypass of a corresponding ATS module slot, according to some embodiments. The ATS cabinet 401 included in FIG. 4A-B can be included in any of the embodiments of ATS cabinets included herein.

In some embodiments, an elevated ATS cabinet includes one or more bypass circuits which can be selectively closed to route a selected power feed, in a bypass of a selected ATS module slot, to a particular cabinet outlet receptacle to which the selected slot is coupled. As a result, a selected ATS module installed in the selected ATS module slot can be selectively bypass via a selected power feed, thereby isolating the ATS module and enabling the ATS module to be removed from the slot without interrupting power support provided to an electrical load coupled to the cabinet outlet receptacle.

As shown in FIG. 4A-B, a system includes an elevated ATS cabinet 401 which includes bypass circuits 420A-B which are each configured to route a particular power feed, received from a particular cabinet input receptacle 404A-B which can be coupled to a separate power transmission line 402A-B, in a bypass of a particular ATS module slot 411. As a result, selectively closing one of the bypass circuits 420A-B results in the closed circuit routing power in a bypass of any ATS module 410 installed in the slot 411, thereby electrically isolating the module 410 and enabling the module 410 to be removed from the slot 411 without interrupting power support to any electrical loads which are coupled to the receptacle 416 via one or more power transmission lines 418.

In some embodiments, each bypass circuit 420 includes a bypass element 430 which can selectively close or open the respective circuit 420 based on manual interaction with the respective element 430. In some embodiments, the bypass element 430 comprises a switch device which is configured to selectively slot the respective circuit 420.

In some embodiments, a bypass element 430 included in a bypass circuit 420 comprises a slot element which comprises an open space that electrically isolates separate portions of the respective bypass circuit 420. The bypass circuit 420 can be closed based on manual insertion of a conductive element into the slot element 430 of the circuit 420, where the conductive element electrically couples the separate portions of the bypass circuit, thereby closing the circuit.

As shown, a system 400 can include a device 490, referred to herein as a "paddle device" which is configured to be manually inserted into a particular slot element 430 of a selected bypass circuit 420 to cause the selected bypass circuit 420 to close, thereby routing a particular power feed received at a particular interface 404A-B to the receptacle 416 in a bypass of the ATS module 410. The device 490 can include a conductive element 492 which can be inserted into a slot element 430, and an insulating element 491 which protects an operator from an electrical current which can be carried by the conductive element when the element 492 is inserted in a slot element 430.

As shown, in some embodiments, each bypass circuit 420A-B includes a respective circuit breaker device 422A-B which is configured to open the respective bypass circuit 420A-B in response to a current through the respective bypass circuit 420A-B exceeding a particular threshold amount. In some embodiments, the devices 422A-B are absent from the bypass circuits 420A-B in the cabinet 400, and the paddle device 490 includes, in the conductive element 492, a circuit breaker device 494. When the conductive element 492 is inserted into a slot element 430 included in a bypass circuit 420, the circuit breaker device 494 is electrically coupled to the bypass circuit 420 and can open the bypass circuit 420 based on a current through the circuit 420 exceeding a threshold level. Because the bypass circuit 420 can be open in the absence of the conductive element 492 being inserted into the slot element 430 of the circuit 420, a circuit breaker 422 may not be required to be included in the cabinet 401, and the quantity of circuit breakers required in system 400 can be limited to the circuit breaker device 494 included in the conductive element 492.

FIG. 4A illustrates system 400 where ATS cabinet 401 is selectively routing a power feed received at interface 404A, via the connectors 408A, 412 of slot 411 and ATS module 410 coupled to the connectors 408A, 412, to a cabinet outlet receptacle 416 of the cabinet 401. As shown in FIG. 4A, the bypass circuits 420A-B are open based on the slot element 430A-B in the circuits 420A-B partitioning the respective circuits 420A-B into electrically isolated portions.

FIG. 4B illustrates system 400 where the conduct element 492 of paddle device 490 is inserted into the slot element 430A of cabinet 401. The insertion of the conductive element 492 into slot element 430A results in closing the bypass circuit 420A, thereby routing the feed received at interface 404A to the receptacle 416 in a bypass of the ATS module 410. Circuit 420B remains open, as no conductive element is inserted into slot element 430B. As a result, inserting a conductive element 492 into a selected slot element 430 results in routing a selected power feed in a bypass of a selected ATS module installed in a selected ATS module slot.

Figure 5:
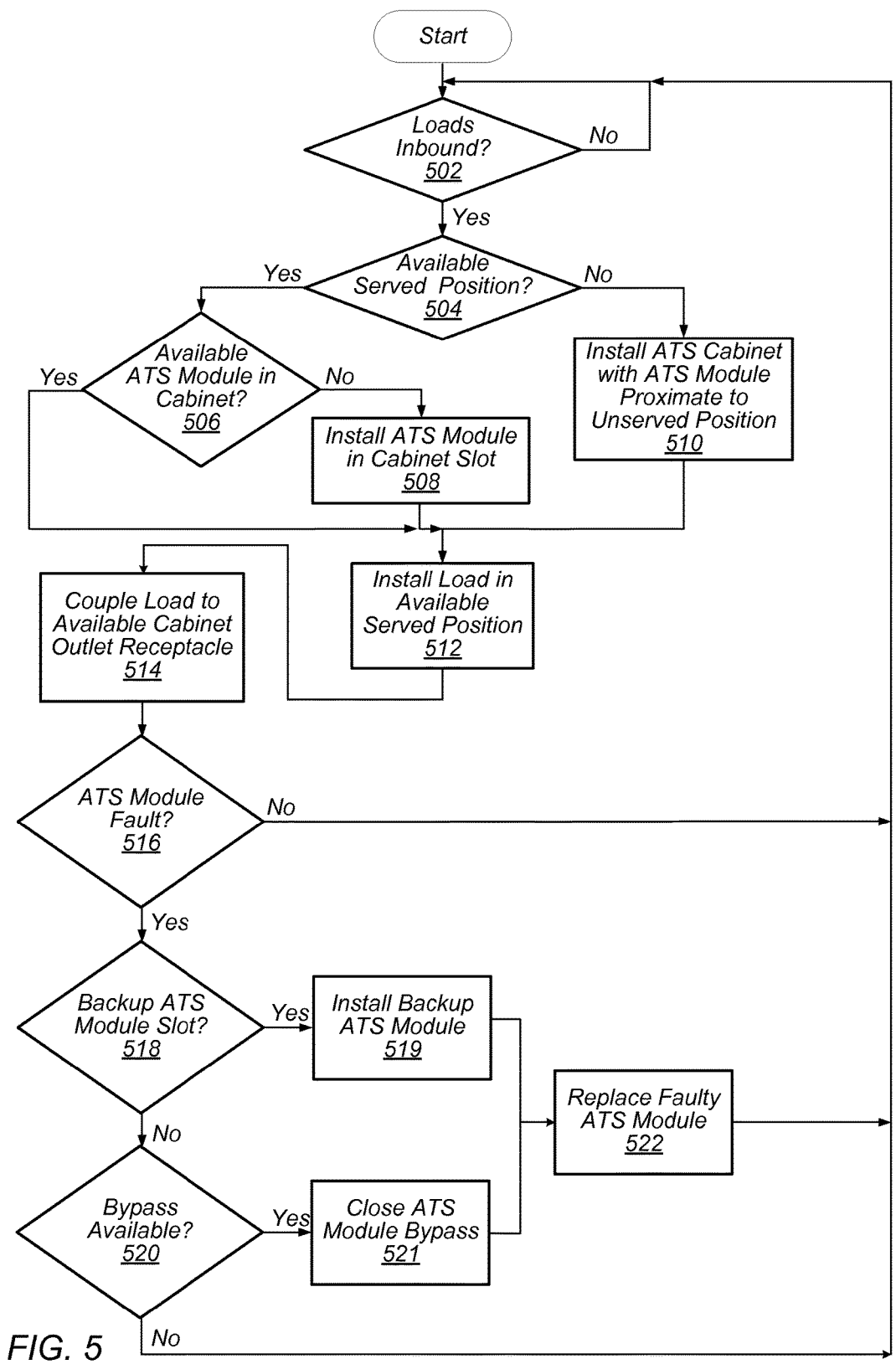
FIG. 5 is a flow diagram illustrating configuring an elevated ATS cabinet to provide power redundancy support to one or more electrical loads, according to some embodiments.

FIG. 5 is a flow diagram illustrating configuring an elevated ATS cabinet to provide power redundancy support to one or more electrical loads, according to some embodiments. The configuring can be implemented with regard to any of the embodiments of elevated ATS cabinets. In some embodiments, some or all of the configuring can be implemented by one or more computer systems.

At 502, a determination is made regarding whether one or more electrical loads, which can include one or more rack computer systems which include one or more sets of computer systems, are inbound to be installed in a load space. The determination can be made based at least in part upon one or more of physical arrival of the electrical loads at the load space, receipt of an indication that the one or more electrical loads are physically being delivered to the load space, etc. The space can include a computer space in a data center, and the electrical loads can include one or more rack computer systems.

At 504, based on the determination that one or more electrical loads are inbound, a determination is made regarding whether one or more corresponding load positions in the load space are available to accommodate the one or more electrical loads and are presently located proximate to an installed ATS cabinet, such that the positions are referred to as being "served" by the installed ATS cabinet. A position which is "served" by an ATS cabinet can refer to a load position where an electrical load installed in the position can be electrically coupled with a cabinet outlet receptacle of the ATS cabinet, such that the electrical load receives power support from one or more ATS modules included in the ATS cabinet. Whether a position is "served" and "available" can be based on a determination of whether a proximate ATS cabinet includes one or more cabinet outlet receptacles which are available to be electrically coupled to a load installed in the position. Such one or more cabinet outlet receptacles can include cabinet outlet receptacles to which one or more other electrical loads are not presently electrically coupled.

At 510, in response to a determination that no available served positions are in the space, an ATS cabinet is installed proximate to one or more available, unserved positions, and at least one ATS module is installed in at least one ATS module slot of the ATS cabinet, such that the ATS cabinet is configured to provide one or more of power support, power redundancy support, etc. to one or more electrical loads installed in at least one proximate available position. As a result, the at least one proximate available position can be referred to as an available served position. The quantity of ATS modules installed in the cabinet installed at 510 can match the quantity of electrical loads which are determined to be inbound for installation at 502. Installing an ATS cabinet can include coupling an input receptacle to one or more multiple-phase power feeds, which can include a power transmission line which carries a multiple phase power feeds. Where an ATS cabinet is configured to include ATS modules which selectively supply one of two multiple-phase power feeds to corresponding cabinet outlet receptacles, installing the ATS cabinet can include coupling two separate cabinet input receptacles with separate power feeds of the two power feeds.

At 506, in response to a determination that an available served position is present in the space at 504, a determination is made regarding whether an available ATS module which is not presently supporting an installed electrical load is present in the ATS cabinet, such that an inbound load can be electrically coupled to one or more power feeds via the available ATS module when the electrical load is coupled to an available outlet of the cabinet. If not, as shown at 508, an ATS module is installed in at least one slot in the cabinet, where the installation of the ATS module includes electrically coupling ATS inlet connectors in the ATS module with slot power feed connectors coupled to one or more power feeds in the slot, and electrically coupling an ATS outlet connector in the module with a slot outlet connector in the slot. Such electrical coupling can be established via blind-mate connections between blind mate connectors on the module and the slot, where the blind-mate connections are established based at least in part upon slidably engaging the module into the slot.

As a result of installing the ATS module in a cabinet slot at 508, at least one available outlet of the cabinet is electrically coupled to the ATS included in the ATS module and is further electrically coupled to at least one power feed via the ATS module.

At 512, the inbound load is installed in the available served position. Such installation can include physically mounting the load in the position. At 514, the installed load is coupled to the available outlet receptacle which is electrically coupled to an available ATS module. The coupling can include extending a power conduit of the electrical load, including a power cable which terminates in a power cable connector, from the electrical load and coupling the power cable connector to the available cabinet outlet, so that the load is electrically coupled to an available ATS via the power cable and the available cabinet outlet receptacle. Such coupling can be independent of any branch circuits between the cabinet and the electrical load.

In some embodiments, ATS cabinets and electrical loads, including rack computer systems, are installed in sets, where each ATS cabinet includes multiple cabinet outlet receptacles which are configured to supply power, selectively distributed by a separate ATS module included in the ATS cabinet, at a separate phase, and separate outlet receptacles in a given ATS cabinet of the set can be coupled to separate rack PDUs included in separate racks of the set, so that a given ATS cabinet in the set supplies power to at least one portion of the electrical loads included in each separate rack computer system of the set, and each rack computer system of the set is configured to receive power, at separate electrical loads included therein, from separate ATS cabinets included in the set. In addition, each separate rack computer system can be configured to receive power, at the various electrical loads included therein, at a common phase. For example, installing a set of ATS cabinets and racks can include coupling the cabinet outlet receptacles of each of the ATS cabinets in the set which carry A phase power to the rack PDUs included in a first rack, coupling the cabinet outlet receptacles of each of the ATS cabinets in the set which carry B phase power to the rack PDUs included in a second rack, etc.

At 516, a determination is made regarding whether one or more ATS modules in a given ATS cabinet are associated with a fault condition. Such ATS modules can include one or more ATS modules presently providing one or more of power support, power redundancy support, etc. to one or more electrical loads. Such a determination can be based on a determination that a failure has occurred in association with one or more portions of the ATS module. A failure, fault condition, etc. associated with an ATS module can include an ATS included in the ATS module being determined to be stuck in a particular switch position, such that the ATS is restricted from switching to supply power from a different power feed than the feed which the ATS is presently supplying.

If so, at 518, a determination is made regarding whether a corresponding backup ATS module slot, which is electrically coupled in parallel with the ATS module slot in which the ATS module associated with the fault condition is installed, is included in the ATS cabinet. If so, a backup ATS module is installed in the corresponding backup ATS module slot, such that the "faulty" ATS module and the backup ATS module are electrically coupled to the power feeds and to a given cabinet outlet receptacle in parallel. As a result, the "faulty" ATS module can be replaced, at 522, without loss of power support and power redundancy support as such support can be provided by the backup ATS module. Upon replacement of the faulty ATS module with a replacement ATS module, the backup ATS module can be removed from the backup ATS module slot.

If a corresponding backup ATS module slot is not available, a determination is made, at 520, regarding whether a bypass circuit which can bypass the "faulty" ATS module is available in the elevated ATS cabinet is available. If so, the bypass is closed, at 521, and the faulty ATS module is replaced, at 522. Subsequent to replacement of the "faulty" ATS module with a replacement ATS module, the bypass circuit can be opened.

Figure 6:
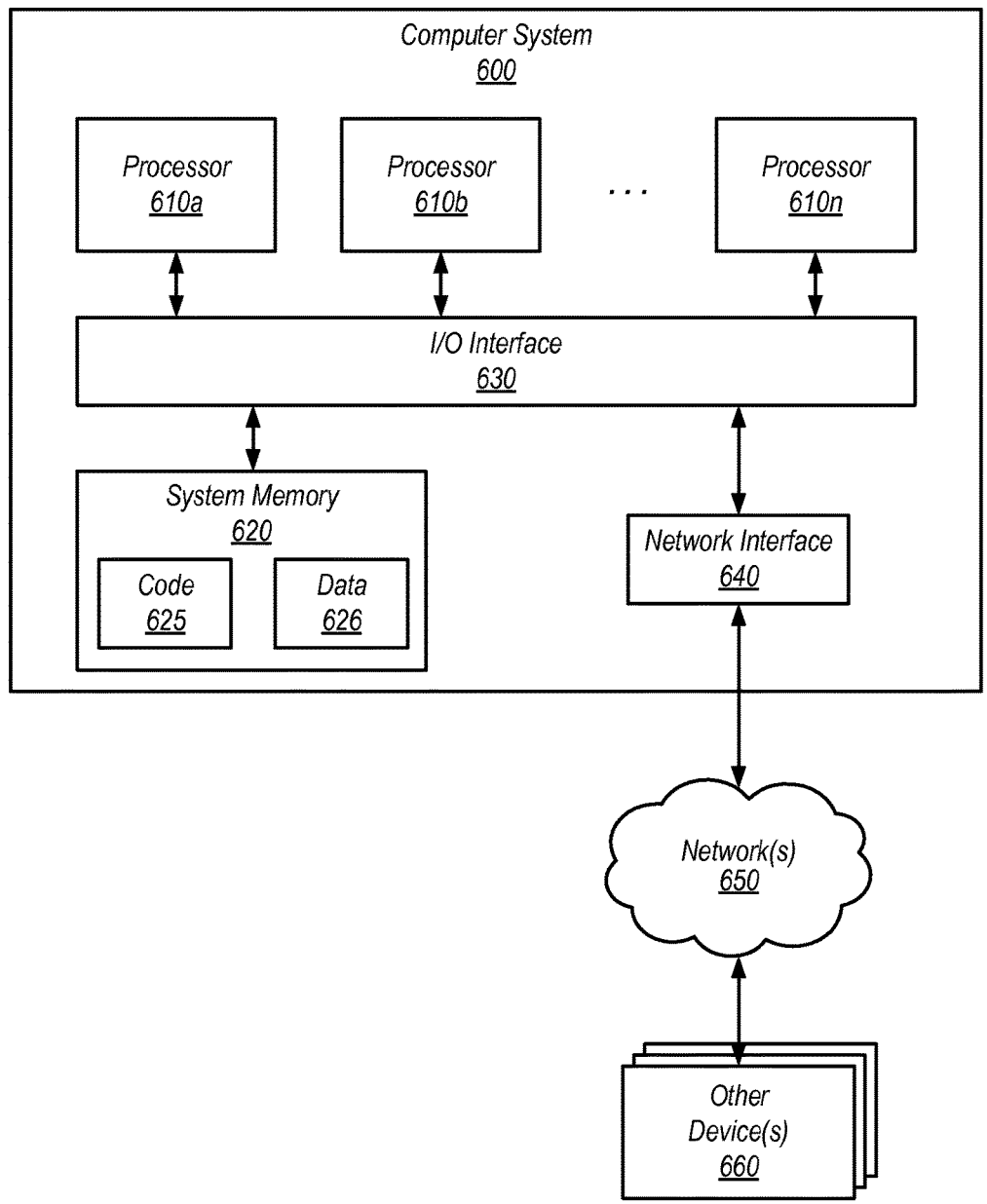
FIG. 6 is a block diagram illustrating an example computer system that may be used in some embodiments.

FIG. 6 is a block diagram illustrating an example computer system that may be used in some embodiments.

In some embodiments, a system that implements a portion or all of one or more of the technologies, methods, systems, devices, and apparatuses as described herein may include a general-purpose computer system that includes or is configured to access one or more computer-accessible media, such as computer system 600 illustrated in FIG. 6. In the illustrated embodiment, computer system 600 includes one or more processors 610 coupled to a system memory 620 via an input/output (I/O) interface 630. In some embodiments, computer system 600 further includes a network interface 640 coupled to I/O interface 630. In some embodiments, computer system 600 is independent of a network interface and can include a physical communication interface that can couple with a communication pathway, including a communication cable, power transmission line, etc. to couple with various external components, systems, etc.

In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor(s) 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of one or more of the technologies, methods, systems, devices, and apparatuses as described herein, are shown stored within system memory 620 as code 625 and data 626.

In one embodiment, I/O interface 630 may be configured to coordinate I/O traffic between processor 610, system memory 620, and any peripheral devices in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices 660 attached to a network or networks 650, such as other computer systems, components, processor units, or devices as illustrated in FIGS. 1 through 5, for example. In various embodiments, network interface 640 may support communication via any suitable wired or wireless general data networks, such as types of Ethernet network, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a computer-accessible medium configured to store program instructions and data for implementing embodiments of a portion or all of one or more of the technologies, methods, systems, devices, and apparatuses as described herein relative to FIGS. 1-5. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 600 via I/O interface 630. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 600 as system memory 620 or another type of memory. Further, a computer-accessible medium may include transmission media or signals such as electrical, electromagnetic, or digital signals, conveyed via a communication medium such as a network and/or a wireless link, such as may be implemented via network interface 640.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center, comprising:
at least two power distribution systems configured to supply multiple-phase power; at least one set of computer systems mounted in a rack and one or more power distribution units configured to distribute received power to the computer systems mounted in the rack; and
at least one elevated automatic transfer switch (ATS) cabinet mounted in an elevated position above the rack, wherein automatic transfer switches of ATS modules mounted in the elevated ATS cabinet are each configured to selectively supply power, to computer systems included in the rack, from a selected one of the at least two power distribution systems,
wherein each elevated ATS cabinet of the at least one elevated ATS cabinet comprises:
at least two multiple-phase input receptacles configured to couple to at least two multiple-phase power feeds from the at least two power distribution systems, wherein each of the at least two multi-phase input receptacles are configured to distribute separate respective single-phases of a coupled multiple phase power feed to respective internal power feeds of the elevated ATS cabinet;
the respective internal power feeds, wherein the respective internal power feeds are configured to carry separate respective single-phase power feeds distributed from the at least two multi-phase input receptacles; and
at least two ATS modules mounted in separate ATS module slots of a set of at least two ATS module slots of the elevated ATS cabinet, wherein each ATS module slot is configured to electrically couple a respective ATS module installed in the respective ATS module slot with a separate internal power feed of the respective internal power feeds of the elevated ATS cabinet, wherein the respective ATS module is coupled to the respective internal power feed of the elevated ATS cabinet based on respective blind-mate connections between a set of blind-mate slot power feed connectors of the respective ATS module slot and a set of blind-mate ATS inlet connectors of the respective ATS module.

2. The data center of claim 1, wherein:
each elevated ATS cabinet of the at least one elevated ATS cabinet further comprises:
two or more cabinet outlet receptacles coupled to two or more power distribution units associated with the rack, wherein the elevated ATS cabinet is configured to provide power redundancy support to the computer systems mounted in the rack.

3. The data center of claim 2, wherein:
the at least one set of computer systems mounted in the rack comprises at least a first set of computer systems mounted in a first rack and a second set of computer systems mounted in a second rack, wherein a first one of the two or more power distribution units is associated with the first rack and another one of the two or more power distribution units is associated with the second rack; and
respective ones of the power distribution units are coupled to a respective cabinet outlet receptacle of the elevated ATS cabinet which supplies power having a common phase, wherein the set of computer systems included in the first rack are supplied a common phase of power from the ATS modules included in the elevated ATS cabinet via a first one of the two or more cabinet outlet receptacles, and wherein the set of computer system included in the second rack are supplied a different common phase of power from the ATS modules included in the ATS cabinet via another one of the two or more outlet receptacles.

4. The data center of claim 1, wherein:
the elevated ATS cabinet comprises a set of bypass circuits, wherein respective ones of the bypass circuits are configured to selectively route a selected one of the respective internal power feeds such that a selected ATS module slot coupled to the selected internal power feed is bypassed, wherein the selected ATS module is bypassed based on insertion of a conductive element into a slot element of a selected bypass circuit, wherein the slot element isolates separate portions of the selected bypass circuit, and wherein insertion of the conductive element into the slot element electrically couples the separate portions and closes the selected bypass circuit.

5. An apparatus, comprising:
an elevated automatic transfer switch (ATS) cabinet configured to provide power support to a set of electrical loads via a set of ATS modules which are each configured to selectively distribute power to the electrical loads from a selected power feed, wherein the elevated ATS cabinet comprises:
a multiple-phase cabinet input receptacle configured to:
couple to a multiple-phase power transmission line; and
distribute separate respective single-phases of a multi-phase power feed to respective separate internal power feeds of the elevated ATS cabinet;
the respective separate internal power feeds, each configured to carry a separate single-phase of the multi-phase power feed distributed from the multi-phase cabinet input receptacle; and
a set of two or more ATS module slots, wherein each ATS module slot comprises a set of blind-mate slot power feed connectors electrically coupled to separate ones of the respective separate internal power feeds of the elevated ATS cabinet, wherein each ATS module slot is configured to electrically couple a separate ATS module installed in the respective ATS module slot with the separate ones of the internal power feeds carrying a separate single-phase of the multiple phase power feed, wherein the separate ATS module couples with the separate ones of the internal power feeds based on blind-mate connections between the set of blind-mate slot power feed connectors of the respective ATS module slot and blind-mate ATS inlet connectors of the ATS module.

6. The apparatus of claim 5, wherein the elevated ATS cabinet further comprises:
a set of two or more cabinet outlet receptacles which are each configured to electrically couple an ATS outlet of a separate ATS module, installed in a separate ATS module slot of the elevated ATS cabinet, with a separate electrical load independently of any branch circuits extending between the elevated ATS cabinet and the separate electrical load.

7. The apparatus of claim 6, further comprising:
a set of bypass circuits configured to selectively route a selected internal power feed of the separate internal power feeds, in a bypass of a selected ATS module slot coupled to the selected internal power feed, to a cabinet outlet receptacle which is coupled to the selected ATS module slot.

8. The apparatus of claim 7, wherein:
the set of bypass circuits comprises a set of slot elements, wherein each slot element separates a separate bypass circuit into two electrically-isolated portions;
wherein each slot element is configured to receive a manually-inserted paddle device into the slot element to close a corresponding bypass circuit by electrically coupling the electrically-isolated portions of the corresponding bypass circuit.

9. The apparatus of claim 8, wherein:
the paddle device comprises a circuit breaker device which is configured to electrically isolate the electrically-isolated portions of the bypass circuit based on a bypass current through the bypass circuit exceeding a threshold amount.

10. The apparatus of claim 9, wherein:
the circuit breaker device included in the paddle device comprises a modular assembly configured to be reversibly installed in the paddle device.

11. The apparatus of claim 6, wherein the elevated ATS cabinet further comprises for each given ATS module slot in the set of ATS module slots:
a corresponding backup ATS module slot which comprises blind-mate slot power feed connectors which are electrically coupled in parallel with particular internal power feeds of the separate internal power feeds to which the blind-mate slot power feed connectors of the given ATS module are coupled, such that the corresponding backup ATS module slot is configured to electrically couple a backup ATS module installed in the corresponding backup ATS module in parallel with an ATS module installed in the given ATS module.

12. The apparatus of claim 11, wherein:
respective ones of the ATS module slots in the set of ATS module slots are configured to open on an opposite face of the elevated ATS cabinet from a face to which corresponding backup ATS module slots in the set of ATS module slots opens, wherein an ATS module installed in the given ATS module slot is installed via an opposite face from the face into which a backup ATS module is installed into the corresponding backup ATS module slot.

13. The apparatus of claim 11, wherein:
the respective ones of the ATS module slots are configured to open on a common face of the elevated ATS cabinet to which the corresponding backup ATS module slots open, wherein an ATS module installed in one of the respective ATS module slots is installed via a common face into which the backup ATS module is installed into the corresponding backup ATS module slot.

14. A method, comprising:
configuring an elevated automatic transfer switch (ATS) cabinet to provide power support to a set of electrical loads via a set of ATS modules which are each configured to selectively distribute power to electrical loads from a selected power feed, wherein the configuring comprises:
coupling a multiple-phase cabinet input receptacle of the elevated ATS cabinet to a multiple-phase power transmission line carrying an individual multiple phase power feed, wherein the multiple-phase cabinet input receptacle is configured to distribute separate single phases of the individual multiple phase power feed to separate internal power feeds of the elevated ATS cabinet, wherein the separate internal power feeds are each configured to carry a separate single-phase of the multi-phase power feed distributed from the multi-phase cabinet input receptacle; and
installing a set of two or more ATS modules in a set of two or more ATS module slots of the elevated ATS cabinet, wherein each ATS module slot comprises a set of blind-mate slot power feed connectors that are electrically coupled to a separate one of the separate internal power feeds of the elevated ATS cabinet, wherein installing a given ATS module in a given ATS module slot comprises establishing blind-mate connections between the set of blind-mate slot connectors in the given ATS module slot and blind-mate ATS inlet connectors of the given ATS module, wherein established blind-mate connections electrically couple the given ATS module with one of the separate internal power feeds configured to carry a separate single-phase of the individual multiple phase power feed.

15. The method of claim 14, wherein:
the elevated ATS cabinet comprises a set of cabinet outlet receptacles which are each configured to electrically couple an ATS outlet of a separate ATS module, installed in a separate ATS module slot, with a separate electrical load independently of any branch circuits extending between the elevated ATS cabinet and the separate electrical load; and
the configuring comprises physically coupling separate power cable connectors, of separate power cables extending from the separate electrical loads, with separate cabinet outlet receptacles, of the set of cabinet outlet receptacles, independently of any branch circuits extending between the elevated ATS cabinet and the separate electrical loads, wherein each outlet receptacle of the set of cabinet outlet receptacles electrically couples at least a portion of the separate electrical loads with separate ATS modules installed in the elevated ATS cabinet.

16. The method of claim 15 wherein:

the elevated ATS cabinet comprises a bypass circuit which is configured to be selectively closed to selectively route a selected one of the separate internal power feeds, in a bypass of a selected ATS module slot coupled to the selected internal power feed, to a cabinet outlet receptacle which is coupled to the ATS module slot; and the method comprises closing the bypass circuit, based on manual interaction with a bypass circuit element, wherein the selected internal power feed is supplied to the cabinet outlet receptacle in a bypass of the selected ATS module slot.

17. The method of claim 16, wherein:

the bypass circuit element comprises a slot element which electrically isolates separate portions of the bypass circuit; and closing the bypass circuit comprises inserting a paddle device into the slot element, such that the paddle device electrically couples the separate portions of the bypass circuit.

18. The method of claim 15, wherein:

the elevated ATS cabinet comprises, for each ATS module slot in the set of ATS module slots, a corresponding backup ATS module slot which comprises blind-mate slot power feed connectors which are electrically coupled in parallel with a particular internal power feed of the separate internal power feeds to which the blind-mate slot power feed connectors of the given ATS module are coupled; and the method further comprises installing a backup ATS module in at least one backup ATS module slot, based on a determination of a fault associated with a corresponding ATS module installed in a corresponding ATS module slot, such that the backup ATS module is electrically coupled, in parallel with the corresponding ATS module, to a common set of the internal power feeds comprising the particular internal power feed and a common cabinet outlet receptacle.

19. The method of claim 18, wherein:

each given ATS module slot in the set of ATS module slots is configured to open on an opposite face of the elevated ATS cabinet from a face to which the corresponding backup ATS module slot opens; and installing the backup ATS module in at least one backup ATS module slot comprises installing the backup ATS module into the at least one backup ATS module slot though an opening in a face of the elevated ATS cabinet which is opposite from another face of the elevated ATS cabinet through which the corresponding ATS module is installed into the corresponding ATS module slot.

20. The method of claim 18, wherein:

each given ATS module slot in the set of ATS module slots is configured to open on a common face of the elevated ATS cabinet on which the corresponding backup ATS module slot opens; and installing the backup ATS module in at least one backup ATS module slot comprises installing the backup ATS module into the at least one backup ATS module slot though an opening in a face of the elevated ATS cabinet which is common with a face of the elevated ATS cabinet through which the corresponding ATS module is installed into the corresponding ATS module slot.

* * * * *